United States Patent
Keller et al.

(10) Patent No.: US 9,791,315 B2
(45) Date of Patent: Oct. 17, 2017

(54) APPARATUS FOR ENABLING WIDE-FIELD POLARIMETRY

(71) Applicant: UNIVERSITEIT LEIDEN, Leiden (NL)

(72) Inventors: Christoph Ulrich Keller, Leiden (NL); Frans Snik, Leiden (NL)

(73) Assignee: Universiteit Leiden, Leiden (NL)

( * ) Notice: Subject to any disclaimer, the term of this patent is extended or adjusted under 35 U.S.C. 154(b) by 109 days.

(21) Appl. No.: 14/761,328

(22) PCT Filed: Jan. 16, 2014

(86) PCT No.: PCT/EP2014/050842
§ 371 (c)(1),
(2) Date: Jul. 16, 2015

(87) PCT Pub. No.: WO2014/111487
PCT Pub. Date: Jul. 24, 2014

(65) Prior Publication Data
US 2015/0355022 A1    Dec. 10, 2015

(30) Foreign Application Priority Data
Jan. 16, 2013    (GB) .................................. 1300776.0

(51) Int. Cl.
*G01J 3/02* (2006.01)
*G01J 4/04* (2006.01)
(Continued)

(52) U.S. Cl.
CPC ........... *G01J 3/0224* (2013.01); *G01J 1/0425* (2013.01); *G01J 1/4228* (2013.01); *G01J 3/0218* (2013.01);
(Continued)

(58) Field of Classification Search
CPC ...... G01J 1/0425; G01J 1/4228; G01J 3/0218; G01J 3/0224; G01J 3/14; G01J 4/00;
(Continued)

(56) References Cited

U.S. PATENT DOCUMENTS 3,572,938 A  *  3/1971  Bradford ................... G01J 4/04
                                                                 250/225
4,682,024 A        7/1987  Halldorsson et al.
(Continued)

FOREIGN PATENT DOCUMENTS

DE          19547552 C1      3/1997
WO        WO-03016844 A1    2/2003
WO       WO-2014111487 A1   7/2014

OTHER PUBLICATIONS

"JPL's Earth Science Airborne Program", [online]. [retrieved on Mar. 9, 2015]. Retrieved from the Internet: <URL: http://airbornescience.jpl.nasa.gov/instruments/airmspi>, (2015), 2 pgs.
(Continued)

*Primary Examiner* — Gordon J Stock, Jr.
(74) *Attorney, Agent, or Firm* — Schwegman Lundberg & Woessner, P.A.

(57) ABSTRACT

A polarimetry apparatus comprising a plurality of flexible light conduits each having first and second ends, and a respective polarization modulator associated with each light conduit, wherein each light conduit is configured to receive incident light from a different predetermined region in space via the first end, and deliver said light to a detector unit via the second end, and wherein the polarization modulator is configured to modulate the polarization of the light to enable a partial or complete polarization state of the incident light to be determined by the detector unit for each light conduit.

23 Claims, 6 Drawing Sheets

(51) Int. Cl.
      G02F 1/01    (2006.01)
      G01J 1/42    (2006.01)
      G01J 1/04    (2006.01)
      G01J 3/14    (2006.01)
      G01J 4/00    (2006.01)

(52) U.S. Cl.
      CPC . *G01J 3/14* (2013.01); *G01J 4/00* (2013.01); *G01J 4/04* (2013.01); *G02F 1/0136* (2013.01)

(58) Field of Classification Search
      CPC .......... G01J 4/02; G01J 4/04; G01J 2004/001; G01J 2004/002; G01J 2004/004; G01J 2004/005; G01J 2004/007; G02F 1/0136; G01N 21/21
      See application file for complete search history.

(56) References Cited

U.S. PATENT DOCUMENTS

| | | | | |
|---|---|---|---|---|
| 5,102,222 | A * | 4/1992 | Berger | G01J 4/04 356/365 |
| 5,440,390 | A * | 8/1995 | Tirri | G01J 4/04 356/364 |
| 6,765,672 | B1 | 7/2004 | Veasey | |
| 7,310,144 | B1 * | 12/2007 | Dogariu | G01J 4/00 356/364 |
| 7,336,360 | B2 | 2/2008 | Oka et al. | |
| 8,238,026 | B1 | 8/2012 | Kemme et al. | |
| 8,305,578 | B1 * | 11/2012 | Mudge | G01J 4/04 356/367 |
| 2009/0128814 | A1 * | 5/2009 | Szafraniec | G01J 4/04 356/364 |
| 2011/0206291 | A1 | 8/2011 | Kashani et al. | |
| 2012/0148188 | A1 | 6/2012 | Silny et al. | |
| 2016/0334582 | A1 * | 11/2016 | Eikenberry | G02B 6/06 |
| 2017/0041534 | A1 * | 2/2017 | Xia | H04N 5/23238 |

OTHER PUBLICATIONS

"Polder (POLarization and Directionality of the Earth's Reflectances)", Atmosphere, Land Ocean mission. Climate Research and Environment Monitoring [online]. [retrieved on Mar. 9, 2015]. Retrieved from the Internet: <URL: http://missions-scientifiques.cnes.fr/POLDER/>, (latest update Nov. 12, 2007), 1 pg.

"SPEX Instrument—Spectral modulation", [online]. [retrieved on Mar. 9, 2015]. Retrieved from the Internet: <URL: http://www.sron.nl/spex-instrument-spex-2094>, (2015), 1 pg.

"United Kingdom Application Serial No. GB1300776, United Kindom Search Report mailed Apr. 30, 2013", 3 pgs.

Oka, Kazuhiko, et al., "Spectroscopic polarimetry with a channeled spectrum", *Optics Letters*, 24(21), (1999), 1475-1477.

Peralta, Richard J., et al., "Aerosol Polarimetry Sensor for the Glory Mission", *Proc. of SPIE vol. 6786—MIPPR 2007: Automatic Target Recognition and Image Analysis; and Multispectral Image Acquisition*, (2007), 67865L-1-67865L-17.

Semel, M., et al., "Zeeman-Doppler imaging of active stars. III. Instrumental and technical considerations", *Astron. Astrophys.*, 278, (1993), 231-237.

Snik, Frans, et al., "Spectral modulation for full linear polarimetry", *Applied Optics*, 48(7), (2009), 1337-1346.

"International Application Serial No. PCT/EP2014/050842, International Search Report mailed Mar. 31, 2014", 3 pgs.

"International Application Serial No. PCT/EP2014/050842, Written Opinion mailed Mar. 31, 2014", 6 pgs.

"United Kingdom Application Serial No. GB1300776, United Kingdom Search Report mailed Feb. 28, 2013", 1 pg.

* cited by examiner

APPARATUS FOR ENABLING WIDE-FIELD POLARIMETRY

PRIORITY APPLICATIONS

This application is a U.S. National Stage Filing under 35 U.S.C. 371 from International Application No. PCT/EP2014/050842, filed on 16 Jan. 2014, and published as WO WO2014/111487 on 24 Jul. 2014, which application claims the benefit under 35 U.S.C. 119 to Great Britain Application No. 1300776.0, filed on 16 Jan. 2013.

TECHNICAL FIELD

The present disclosure relates to polarimetry, and in particular concerns an apparatus and method for performing polarimetry over a large field of view using a plurality of flexible light conduits configured to receive incident light from different predetermined regions in space.

BACKGROUND

High-accuracy polarimetry over fields of view spanning more than about 10 degrees in one, and in particular, in two dimensions is difficult to implement and requires highly customized optics and calibration schemes for every particular application. Some existing systems use wide-field optics that introduce large amounts of artificial polarization, and require anti-reflective coatings and/or substantial calibration.

Wide-field optical systems using lenses and/or mirrors (e.g. fish-eye lenses, Schwarzschild-type optical systems etc.) are typically complicated systems which suffer from optical distortions and field-dependent aberrations. In addition, these systems involve interfaces between air/vacuum and optical surfaces through which light rays pass at angles strongly deviating from normal incidence. Fresnel refraction and reflection at these surfaces introduces unwanted polarization that depends on the field position and can drown the small scene polarization to be measured. Special optical designs and coatings can reduce these effects, but not to a level that would be acceptable without significant calibration efforts.

Furthermore, polarization optics that could be placed before a wide-field optical system (i.e. to analyse the polarization of the light before it reaches the wide-field optics) are sensitive to the field angle because of their reliance on anisotropic materials. The issue of large incidence angles also affects such optics. As a result, wide-field polarization optics cannot meet stringent polarimetry performance requirements, and even extensive calibrations may not overcome this limitation.

The apparatus and method disclosed herein may address one or more of these issues.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided a polarimetry apparatus comprising a plurality of flexible light conduits each having first and second ends, and a respective polarization modulator associated with each light conduit, wherein each light conduit is configured to receive incident light from a different predetermined region in space via the first end, and deliver said light to a detector unit via the second end, and wherein the polarization modulator is configured to modulate the polarization of the light to enable a partial or complete polarization state of the incident light to be determined by the detector unit for each light conduit.

Each polarization modulator may be positioned at the first end of the respective light conduit. Each polarization modulator may comprise one or more of a spatial polarization modulator, a temporal polarization modulator and a spectral polarization modulator. Each polarization modulator may comprise one or more of a polarizing beam-splitter, a liquid crystal retarder, a mechanically rotating retarder, a stack of retarders and an electro-optic modulator.

The apparatus may comprise a respective polarizer associated with each light conduit configured to filter the light after modulation to produce a light output having an intensity which is representative of the polarization state. Each polarizer may be positioned at the first end of the respective light conduit. Each polarizer may be positioned at the second end of the respective light conduit. The respective light conduit may be configured to at least partially (or fully) maintain the polarization state of the light. Each polarizer may comprise one or more of a linear polarizer and a polarizing beam-splitter.

The apparatus may comprise a respective detector unit associated with each light conduit. The detector unit may comprise a photodetector configured to record the light output from the respective polarizer. The apparatus may comprise one or more detector units. Each detector unit may be associated with a plurality of light conduits and may comprise a photodetector configured to record the light output from the respective polarizers. Each detector unit may comprise a respective disperser configured to disperse the light output from the respective polarizers to generate intensity spectra for recordal by the photodetector.

Each disperser may comprise one or more of a prism, a grating, a grism, a spatially-variable filter, a filter wheel and a spectrograph. Each photodetector may comprise one or more of a charge-coupled device (CCD) camera, a CMOS sensor and a CMOS hybrid sensor.

The apparatus may comprise one or more optic elements associated with each detector unit configured to direct the light output onto the photodetector. The apparatus may comprise one or more optic elements associated with each light conduit configured to direct the light into the light conduit. The one or more optic elements may comprise one or more lenses and/or mirrors.

The first end of each light conduit may be configured to define a field of view of the light conduit. The apparatus may comprise a field stop and/or one or more optic elements at the first end of each light conduit configured to define a field of view of the light conduit. The field stop may comprise one or more of a baffle and an aperture. The one or more optic elements may comprise one or more lenses and/or mirrors.

Each light conduit may comprise one or more light-conducting elements. Each light-conducting element may comprise an optical fibre or a fluid-filled light pipe. The incident light may have a wavelength of between 10 nm and 1 mm inclusive (i.e. from ultraviolet over visible to the near and thermal infrared).

The apparatus may comprise a mechanical framework configured to define the position and axial orientation of each light conduit. The mechanical framework may have a planar, convex, concave, spherical, hemispherical or ellipsoidal shape.

The mechanical framework may be configured to define the position and axial orientation of each light conduit such that the different predetermined regions in space from which the incident light is received by the light conduits form contiguous or non-contiguous segments of a total field of view of the apparatus at a predetermined distance from the mechanical framework.

The mechanical framework may be configured to define the position and axial orientation of each light conduit such that the first ends of the respective light conduits form a one, two or three dimensional array. The mechanical framework may be configured to define the position and axial orientation of each light conduit such that the first ends of the respective light conduits form an axially parallel, axially divergent or axially convergent array. The second ends of the respective light conduits may be configured to form an axially parallel array.

Each light conduit may comprise a head for attaching the light conduit to the mechanical framework. The head may be configured to define the rotational orientation of the light conduit. The head may comprise one or more of a polarization modulator configured to modulate the polarization state of the light in a predefined manner, a polarizer configured to filter the light after modulation to produce a light output having an intensity which is representative of the polarization state, and one or more optic elements configured to direct the light into the light conduit.

The apparatus may be a polarimeter, a spectropolarimeter, a module for a polarimeter or a module for a spectropolarimeter.

According to a further aspect, there is provided an apparatus as substantially described herein with reference to, and as illustrated by, the accompanying drawings.

According to a further aspect, there is provided a method comprising:
  receiving incident light from a plurality of different predetermined regions in space via first ends of a plurality of respective flexible light conduits;
  modulating the polarization of the light using a respective polarization modulator associated with each light conduit; and
  delivering said light to one or more detector units via second ends of the respective light conduits to enable a partial or complete polarization state of the incident light to be determined by the one or more detector units for each light conduit.

According to a further aspect, there is provided a method comprising:
  providing a plurality of flexible light conduits having first and second ends, and a respective polarization modulator associated with each light conduit;
  configuring each light conduit to receive incident light from a different predetermined region in space via the first end, and deliver said light to a detector unit via the second end; and
  configuring each polarization modulator to modulate the polarization of the light to enable a partial or complete polarization state of the incident light to be determined by the detector unit for each light conduit.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying schematic drawings, in which.

DESCRIPTION OF SPECIFIC ASPECTS/EMBODIMENTS

As mentioned in the background section, current systems for performing wide-field polarimetry suffer from aberrations, distortions and system polarization unless complicated optical designs and/or lens coatings are used together with extensive calibration.

Also, the sensitivity of polarimetric systems is often limited by differential effects. For instance, measurements with a set of optical paths through linear polarizers with different orientations are limited by the calibration of the transmission of the different paths. Moreover, if these paths are not well co-aligned, the differential pointing (i.e. the direction of view) can create spurious polarization signals. With polarization modulation in time, any temporal variation of the pointing, temporal variation of the remote signal relay or temporal variation inherent to the source can limit the polarimetric sensitivity.

The apparatus and method described herein may provide a solution to this problem.

Unlike conventional systems that use optical elements such as lenses and mirrors to combine light from different directions and format it for a spectrograph and/or photodetector, the present apparatus (illustrated in FIG. 1) comprises a plurality of flexible light conduits 101 each having first 102 and second 103 ends. Each light conduit 101 is configured to receive incident light 104 from a predetermined region in space via the first end 102, and deliver said light 104 to a detector unit 105 via the second end 103 to enable a polarization state of the incident light 104 to be determined by the detector unit 105.

The field of view of each light conduit 101 is sufficiently limited that no special optics, coatings or calibration procedures are required (although they could be used with the present apparatus and method). This also serves to reduce the instrumental polarization which can mask the polarization state being measured. By using a plurality of individually positioned/oriented light conduits 101 arranged in one, two or three dimensions, the present apparatus can be used to accommodate arbitrarily large fields of view. For example, a plurality of light conduits 101 may be arranged using a planar mechanical framework (described later with reference to FIGS. 3a, 5a and 5b) such that their respective first ends 102 form a one or two dimensional array configured to receive incident light 104 from a line or area in space, respectively. On the other hand, the plurality of light conduits 101 may be arranged using a curved mechanical framework (described later with reference to FIGS. 3b, 3c, 4a and 4b) such that their respective first ends 102 form a one, two or three dimensional array configured to receive incident light 104 from a point, line or area in space. The detector unit 105 can then measure the optical signal from each light conduit 101 in series or in parallel. The present "modular" approach also allows sampling from specific points, lines or areas in space using a subset of the light conduits 101 when a polarimetric analysis of the complete scene is not required.

Figure 1:
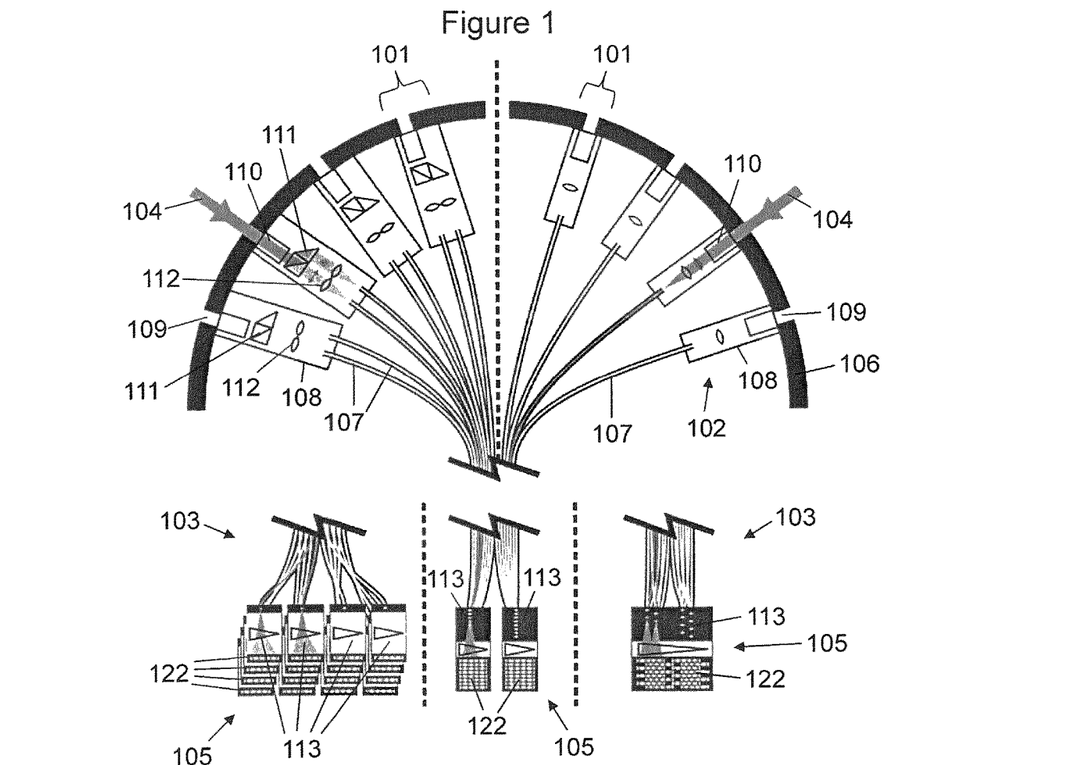
FIG. 1 illustrates schematically the different components of the present apparatus.
Figure 2:
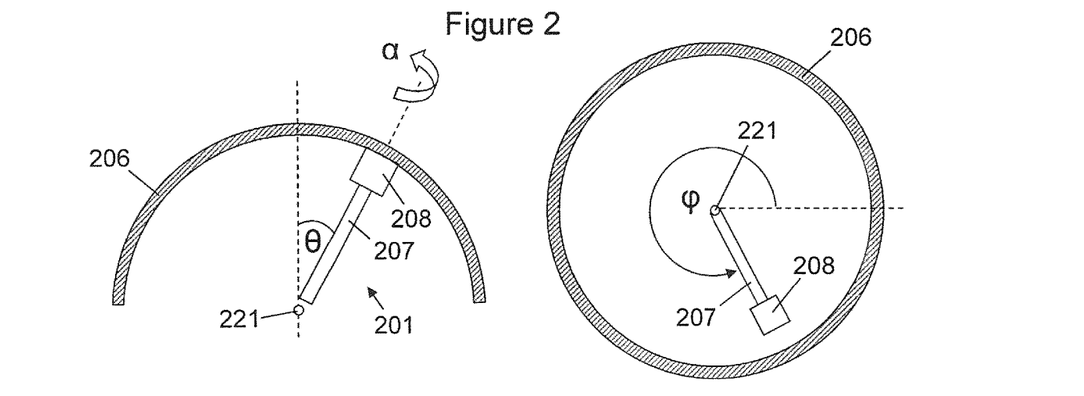
FIG. 2 illustrates schematically the position, axial orientation and rotational orientation of a single light conduit.

As shown in FIG. 1, the apparatus comprises a mechanical framework 106 to define the regions in space from which the incident light 104 is received by each light conduit 101. In this example, each light conduit 101 comprises one or more light-conducting elements 107 (such as optical fibres or fluid-filled light pipes) connected to a head 108 for attaching the light conduit 101 to the mechanical framework 106 via a corresponding hole 109 or connector in the mechanical framework 106. As illustrated in FIG. 2, attachment of the light conduit 201 to the mechanical framework 206 in this way controls the position of the light conducting element 207 and its axial orientation (e.g. polar angle $\theta$ and azimuthal angle $\phi$) about a reference point 221 in the polar coordinate system of the mechanical framework 206. It should be noted, however, that spherical polar coordinates have been used here for convenience, and the mechanical framework 206 is not limited to this spherical configuration.

The shape of the head 208 and the corresponding hole/connector (not shown) can also be used to define the rotational orientation ($\alpha$) of the light conducting element 207 about its own axis. This is particularly important if the direction of polarization is to be determined as well as the amount of polarization. One way of achieving this is to shape the head 208 and corresponding hole/connector such that the head 208 can only be inserted into the mechanical frame 206 in one orientation. Alternatively, a marker on the head 208 and/or mechanical framework 206 may be used to indicate the correct orientation of the head 208 when multiple orientations are possible. For example, square or rectangular shaped heads 208 and corresponding holes/connectors leave 90° or 180° ambiguities. From a polarimetry perspective, a 180° ambiguity may be acceptable but a 90° ambiguity may not be. A marker may therefore be used to remove the 90° ambiguity associated with a square head thus rendering it suitable for use with the present apparatus. Another option is to create one or more notches in the head 208 to interact with corresponding protrusions on the mechanical frame 206, or vice-versa, to ensure a unique rotational orientation ($\alpha$).

A number of different components are required to enable the polarization state of light from a particular region in space to be determined. Each of these components will now be described with reference to FIG. 1. It should be noted, however, that there are a number of different ways in which the various components of the apparatus can be configured to achieve a similar result, and the following description covers just some of these options. For example, the positioning of the components and the particular order in which they are arranged in the optical train may be varied. In addition, although certain components may be shown to operate exclusively on the light received by a single light conduit, it may be possible for these components to be used with multiple light conduits (i.e. as a common component). Furthermore, each of the various components could take different forms and may operate in a number of different ways.

The apparatus comprises a respective polarization modulator 110 positioned at the first end 102 of each light conduit 101 configured to modulate the polarization state of the light 104 in a predefined manner. Each polarization modulator 110 may comprise a temporal polarization modulator (such as a liquid crystal retarder, a mechanically rotating retarder or an electro-optic modulator) or a spectral polarization modulator (such as a stack of retarders as described in the paper entitled "Spectral modulation for full linear polarimetry" by F. Snik et al, Applied Optics, 48, No. 7, 1337 (2009); or a pair of birefringent retarders as described in the paper entitled "Spectroscopic polarimetry with a channelled spectrum" by K. Oka et al, Opt. Lett., 24, 1475 (1999)) possibly in combination with a spatial polarization modulator (such as a polarizing beam splitter). A spatial polarization modulator transforms the polarization state of the incoming light 104 into several beams of light that together contain the polarization information; a temporal polarization modulator transforms a polarization state that is independent of time into polarization states that are strongly time-dependent; and a spectral polarization modulator transforms a polarization state that weakly depends on wavelength into polarization states that strongly depend on wavelength. When a light conduit 101 comprises a spatial polarization modulator combined with a spectral or temporal polarization modulator at its first end 102, the different light beams containing the polarization information are associated with the same entrance aperture.

The complete polarization state of light is contained in four parameters, often called the Stokes parameters, one of which being the intensity. Knowledge of the partial or complete polarization state of light requires that a light conduit contains information about the intensity and one or more additional polarization parameter(s). A polarizer in front of a light conduit only provides information about the sum of the intensity and one polarization parameter, which does not allow a separate measurement of both intensity and the polarization parameter.

By using a respective polarization modulator 110 for each individual light conduit 101, it is possible to determine the polarization state (e.g. partial or complete linear and/or circular polarization state) of the light 104 from a particular region in space using a single light conduit 101. In other words, with the present apparatus, each light conduit 101 carries all of the required polarization information for a given region in space, not merely the intensity for one specific polarization direction. This differs from some existing systems which require polarization information from multiple light conduits 101 to be combined in order to determine the polarization state. This feature of the present apparatus therefore increases the sensitivity of the polarimetry measurements by avoiding the differential effects of multiple light conduits 101.

Each light conduit 101 is configured to receive incident light 104 from a different predetermined region in space via its first end 102. The different predetermined regions in space from which the incident light is received may be located remotely from the polarimetry apparatus, or they may be located at or near the incident surface of the polarimetry apparatus. For example, in FIGS. 5a and 5b, these regions may be taken to be the contiguous 514 or non-contiguous 515 segments located at a respective distance $z_1$ or $z_2$ from the incident surface, or they may be taken to be the regions in space at, or immediately above, the entrance aperture of each light conduit 501. Similarly, in situations where the incident light is received from a point source (e.g. FIG. 3b) or an infinitely distant source, the different predetermined regions in space may be taken to be those regions located at, or immediately above, the entrance aperture of each light conduit 301.

The apparatus also comprises a respective polarizer 111 associated with each light conduit 101 configured to filter the light 104 after modulation to produce a light output having an intensity which is representative of the polarization state. In the illustrated example, each polarizer 111 is positioned at the first end 102 of its respective light conduit 101, but in practice, it could be positioned at the second end 103 provided that the respective light conduit 101 is configured to at least partially maintain the polarization state of the light (e.g. using one or more polarization-maintaining fibres). For example, when a polarizer 111 is positioned at the second end 103 of the respective light conduit 101, it is sufficient that the light conduit 101 only preserves the linear polarization direction of the polarizer 111 and the direction perpendicular to this. Linear polarization at 45° to the direction of the polarizer 111, and any circular polarization, need not be preserved.

Each polarizer 111 may comprise one or more of a linear polarizer and a polarizing beam-splitter. The light conduits 101 shown in the upper left-hand side of FIG. 1 each have a polarizing beam-splitter 111 positioned at their respective first ends 102, whilst the light conduits 101 shown in the upper right-hand side of FIG. 1 have no polarizer positioned at their respective first ends 102. A polarizing beam-splitter 111 generates two or more light outputs containing different aspects of the polarization state of the light 104. In this scenario, the light conduit 101 used to deliver these light outputs to the detector unit 105 comprises a separate light-conducting element 107 for each output (e.g. two light-conducting elements 107 if the polarizing beam-splitter 111 generates two oppositely polarized beams). The flexibility of the light-conducting elements 107 allows them to be positioned in a completely symmetric fashion with respect to optical aberrations of the apparatus. A linear polarizer, on the other hand, generates a single polarized light output and only requires a single light-conducting element 107.

When the apparatus comprises a temporal or spectral polarization modulator 110, the polarizing beam-splitter 111 and associated light-conducting elements 107 can also be used to increase the polarimetric sensitivity by reducing the effects of temporal variations or spectral aliasing, respectively. With temporal modulation, a combination with cotemporal recordings behind a (dual-beam) polarizing beam-splitter 111 offers sufficient redundancy to cancel out the differential effects in time and between the two beams to first order (see M. Semel et al, Astronomy and Astrophysics, 278, No. 1, 231 (1993)). With spectral modulation, on the other hand, differential transmission effects between the two beams can be corrected for in data reduction because of the redundancy of information between the beams (see F. Snik et al, Applied Optics, 48, No. 7, 1337 (2009)). Using these approaches, the present apparatus can be used to determine the polarization state of the incident light 104 with an accuracy of $\sim 1 \times 10^{-3}$ and a sensitivity of $\sim 1 \times 10^{-4}$.

The apparatus may also comprise one or more optic elements 112 positioned between the polarizer 111 (or polarization modulator 110 if the polarizer 111 is positioned at the second end 103 of the respective light conduit 101) and the light conduit 101 configured to direct the light 104 into the light conduit 101. The optic elements 112 may comprise one or more lenses, mirrors and/or diffractive elements.

As shown in FIG. 1, the polarization modulator 110, polarizer 111 and/or optic elements 112 associated with each light conduit 101 may be contained within the head 108 of the light conduit 101. This arrangement facilitates assembly of the apparatus because the positioning and alignment of the various components 110-112 within each head 108 can be fixed before the light conduits 101 are attached to the mechanical frame 106.

Each flexible light conduit 101 then transfers the light 104 from its first end 102 to a detector unit 105 positioned at its second end 103. The detector unit 105 comprises a photodetector 122 configured to record the light output from the polarizer 111 and enable the polarization state of the light 104 to be determined. The detector unit 105 may also comprise an optional disperser 113 configured to disperse the light output to generate an intensity spectrum for recordal by the photodetector 122. The photodetector 122 can be any device configured to enable the light intensity to be recorded (e.g. a CCD camera, a CMOS sensor or a CMOS hybrid sensor), and the disperser 113 may comprise one or more of a prism, a grating, a grism, a spatially-variable filter, a filter wheel and a spectrograph. The detector unit 105 may also comprise one or more optic elements (not shown) positioned between each disperser 113 and photodetector 122 configured to direct the intensity spectrum onto the photodetector 122. Like the optic elements 112 at the first ends 102 of the light conduits 101, these may comprise one or more lenses, mirrors and/or diffractive elements.

Each detector unit 105 is configured to receive light 104 from one or more light conduits 101/light-conducting elements 107. Three possible arrangements are illustrated in the lower part of FIG. 1. The lower left-hand part of FIG. 1 shows each light conduit 101 connected to a respective detector 105 unit; the lower middle part of FIG. 1 shows multiple light conduits 101 connected to the same detector 105 unit; and the lower right-hand part of FIG. 1 shows all light conduits 101 connected to a single detector 105 unit. In the latter scenario, the light conduits 101 are arranged (e.g. in the form of multiple slits or a checkerboard pattern) to optimise use of the available detector area and leave sufficient space for all spectra. This feature is made possible by the use of flexible light conduits 101 which provide mechanical, optical and operational flexibility as well as greater design freedom with respect to the various components of the apparatus. An alternative option is to configure the apparatus such that multiple light conduits 101 can be coupled to a single detector unit 105 sequentially. For example, a mechanical stage (not shown) could be used to re-position the detector unit 105 after each measurement.

The number of light conduits, and their individual positions and orientations, are dependent upon the specific application of the present apparatus. The apparatus may be used, for example, to determine the polarization state of light which has passed through an aerosol or hydrosol in order to characterise the aerosol/hydrosol; it may be used to determine the polarization state of light which has been reflected by the atmosphere of a planet in order to reveal the constituent molecules of the atmosphere; or it may be used to determine the polarization state of light which has passed through a blood sample in order to verify the presence of certain antibodies.

Figure 3A:
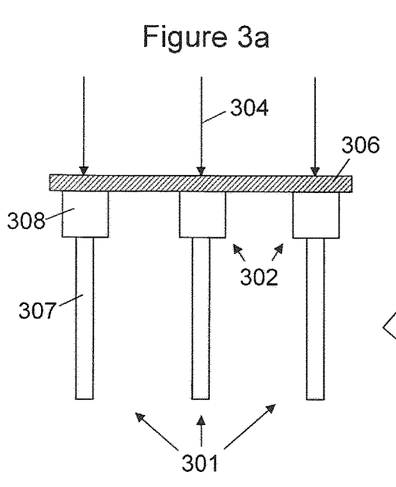
FIG. 3a illustrates schematically an embodiment of the present apparatus comprising a planar mechanical frame.

For laboratory (e.g. medical-based) applications, the apparatus may comprise a one or two dimensional array of, for example, up to 100 light conduits 301 arranged such that the first ends 302 of the respective light conducting elements 307 are substantially parallel to one another. A mechanical framework 306 with a planar shape (as shown in FIG. 3*a* in crosssection) may be connected to the head 308 of each light conduit 301 to position the light conduits 301 in this way. The apparatus could then be used to analyse a plurality of fluid samples (not shown) simultaneously. To achieve this, one or more light conduits 301 may be configured to receive light 304 transmitted through each fluid sample for subsequent detection. Additionally or alternatively, each light conduit 301 may be used to analyse a plurality of light samples in sequence.

Figure 3B:
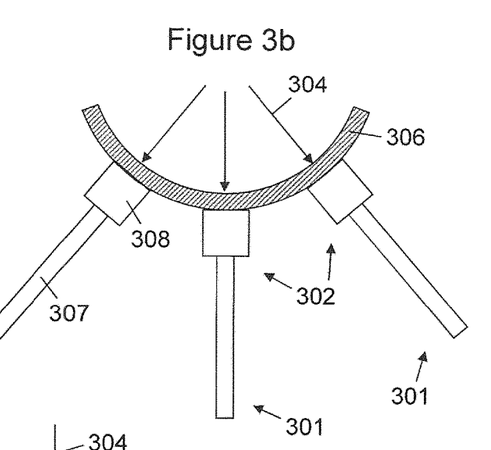
FIG. 3b illustrates schematically an embodiment of the present apparatus comprising a concave mechanical frame.

If the fluid samples scatter light, a plurality of light conduits 301 may be arranged in three dimensions around each fluid sample such that the first ends 302 of the respective light conducting elements 307 are axially convergent in order to receive light 304 scattered in different directions. As shown in FIG. 3*b*, a mechanical framework 306 with a concave shape may be used to achieve this configuration.

Figure 3C:
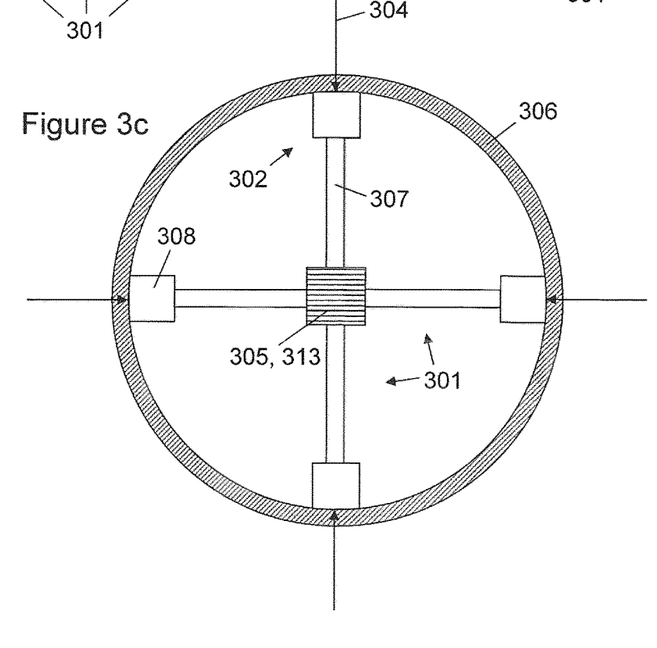
FIG. 3c illustrates schematically an embodiment of the present apparatus comprising a spherical mechanical frame.

For remote sensing applications (e.g. atmospheric investigations), on the other hand, the apparatus may comprise a three dimensional array of, for example, up to 1000 light conduits 301 (or even more) arranged such that the first ends 302 of the respective light conducting elements 307 are axially divergent. This configuration would enable light 304 to be received from different regions in space for subsequent detection by the detector unit (which may comprise a photodetector 305 and disperser 313) and may be achieved using a mechanical framework 306 with a convex, hemispherical or even spherical shape. A spherical arrangement is shown in FIG. 3*c* in cross-section with just 4 light conduits 301 for simplicity. In this scenario, all components of the apparatus may be held within the spherical frame 306 to produce a compact and self-contained system. Furthermore, the spherical arrangement provides a $4\pi$ field of view.

Figure 4A:
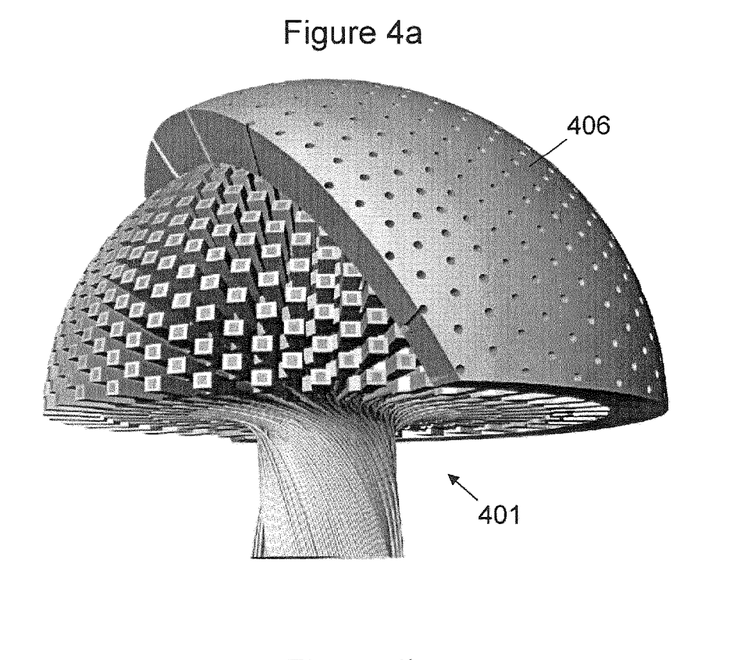
FIG. 4a illustrates schematically an embodiment of the present apparatus comprising a hemispherical mechanical frame.
Figure 4B:
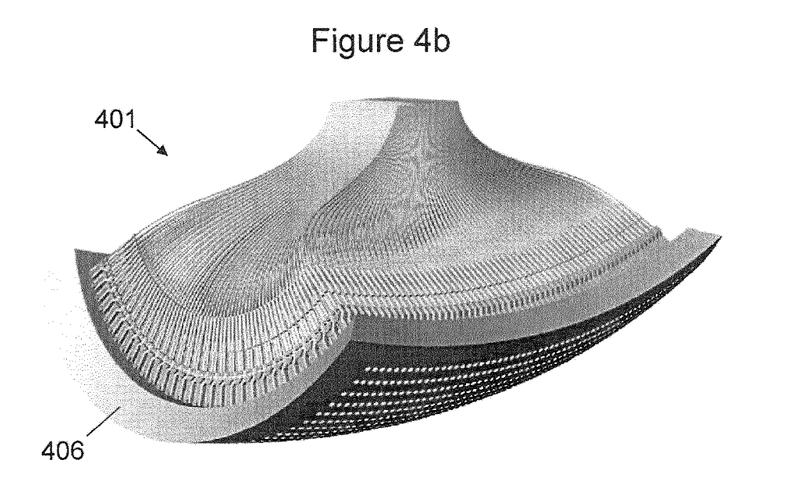
FIG. 4b illustrates schematically an embodiment of the present apparatus comprising a convex mechanical frame.

FIGS. 4*a* and 4*b* show how hemispherical and convex frames 406 (respectively) can be used to position/orient a larger number of light conduits 401. The hemispherical frame 406 is partially cut away to reveal the underlying light conduits 401. In FIG. 4*a*, the first ends 402 of the respective light conduits 401 are positioned across the whole surface of the hemispherical frame 406 but are spaced relatively far apart. As a result, the apparatus can receive light from different regions in space within a solid angle of $2\pi$ steradians at a limited angular resolution. In FIG. 4*b*, the first ends 402 of the respective light conduits 401 are positioned across the whole surface of the convex frame 406 in a more densely packed array. This apparatus can achieve full coverage over a smaller field of view than the apparatus of FIG. 4*a*.

Figure 5A:
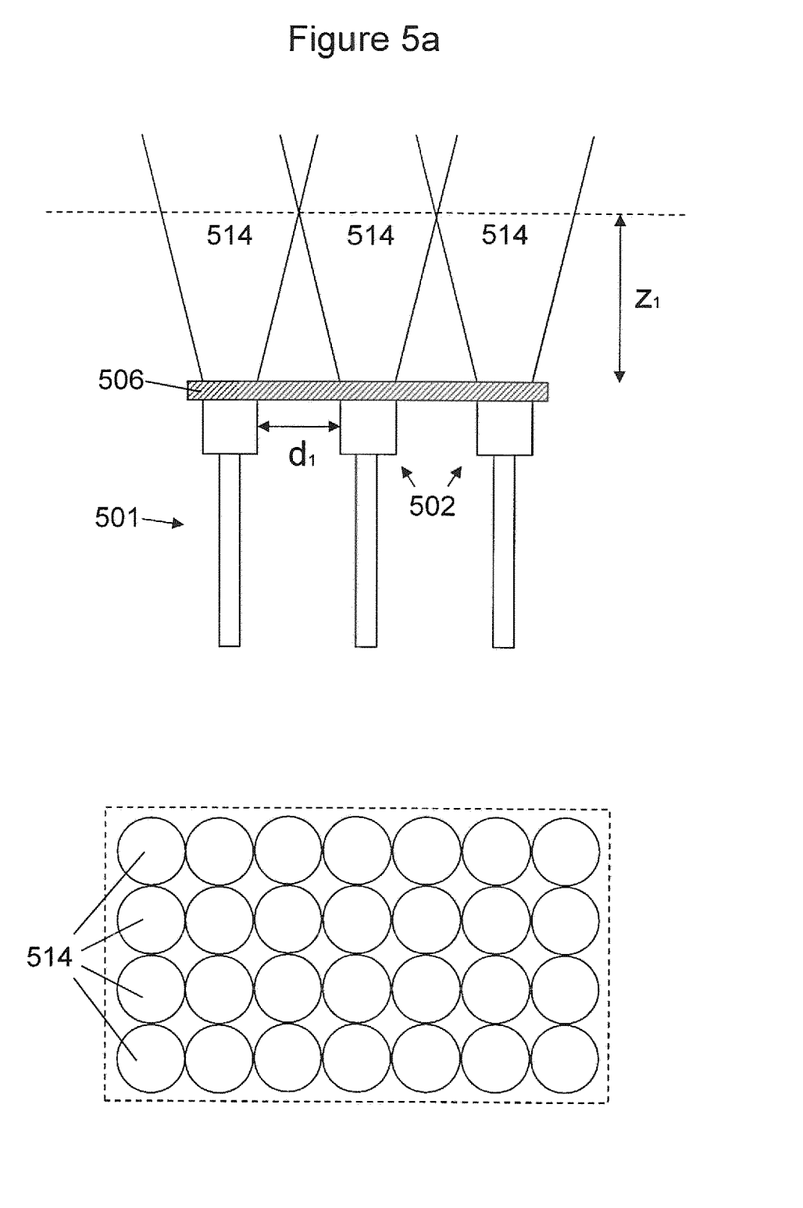
FIG. 5a illustrates schematically an embodiment of the present apparatus in which the different predetermined regions of space form contiguous segments of a total field of view at a predetermined distance from the mechanical frame.
Figure 5B:
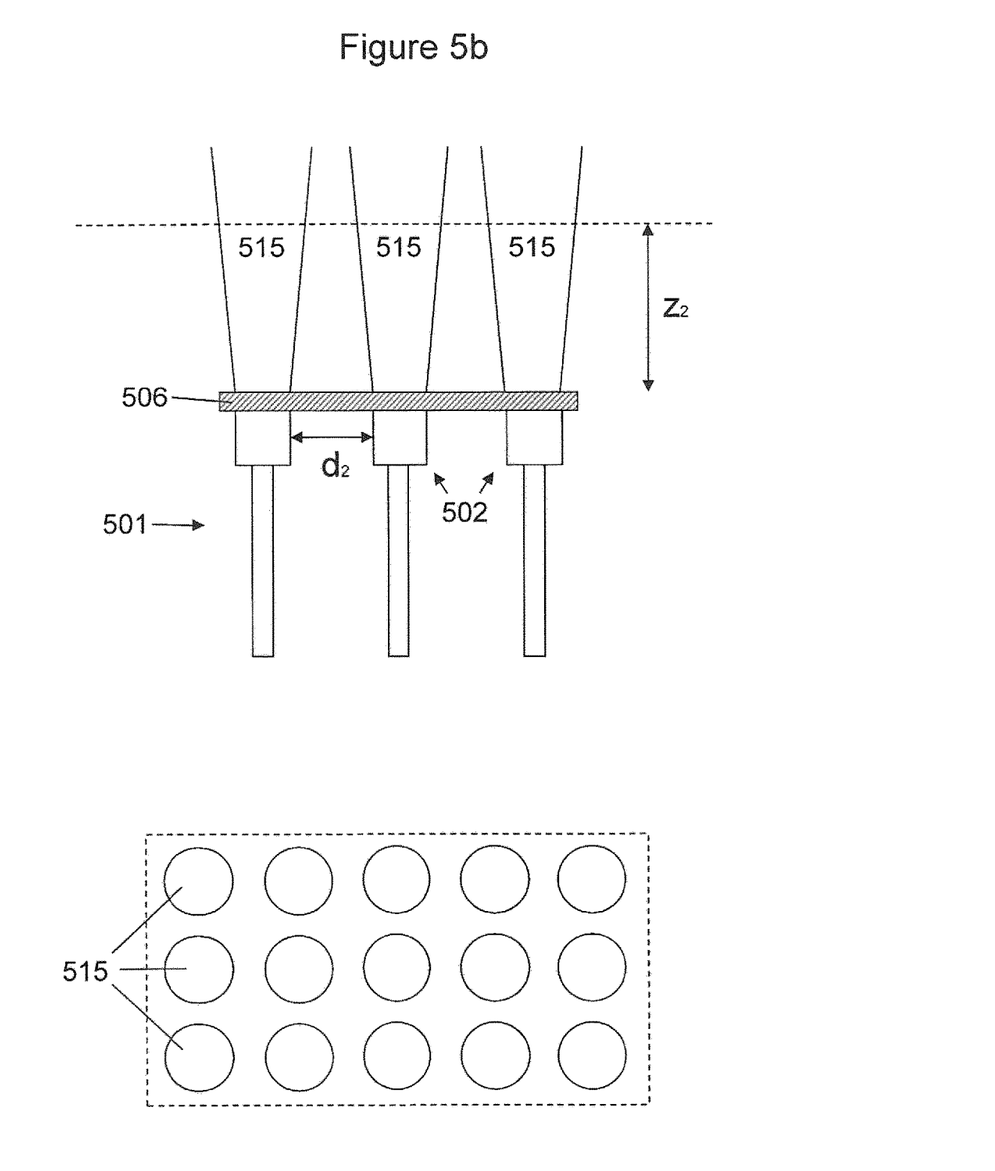
FIG. 5b illustrates schematically an embodiment of the present apparatus in which the different predetermined regions of space form non-contiguous segments of a total field of view at a predetermined distance from the mechanical frame.

The position and axial orientation of the light conduits may be varied to form a contiguous or non-contiguous field of view at a predetermined distance from the apparatus/ mechanical frame. This is illustrated in FIGS. 5*a* and 5*b* in which the first ends 502 of the respective light conduits 501 are arranged to form a substantially parallel array. In FIG. 5*a*, the planar frame 506 is configured such that adjacent light conduits 501 have a spacing $d_1$. With this arrangement, the different predetermined regions in space from which the incident light 504 is received by the light conduits 501 form contiguous segments 514 of a total field of view of the apparatus at a predetermined distance $z_1$, from the mechanical frame 506. In FIG. 5*b*, on the other hand, the planar frame 506 is configured such that adjacent light conduits 501 have a spacing $d_2$. With this arrangement, the different predetermined regions in space from which the incident light 504 is received by the light conduits 501 form non-contiguous segments 515 of a total field of view of the apparatus at a predetermined distance $z_2$ from the mechanical frame 506. The total field of view at distance $z_1$ and $z_2$ from the mechanical frame 506 is shown in plan view in the lower parts of FIGS. 5*a* and 5*b*, respectively. In certain cases, the light conduits 501 may be configured to receive incident light from an infinitely distant source (i.e. parallel light rays rather than convergent or divergent light rays). Furthermore, the light conduits 501 may be configured to provide a contiguous field of view in one dimension and a non-contiguous field of view in the other dimension.

Figure 6A:
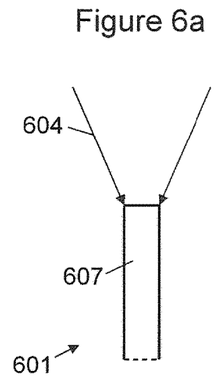
FIG. 6a illustrates schematically a light conduit without image-forming elements.
Figure 6B:
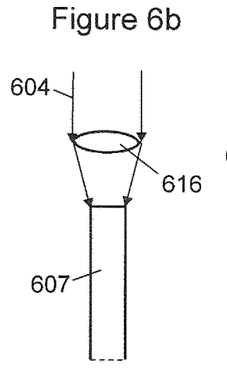
FIG. 6b illustrates schematically a light conduit having an image-forming element that accepts incoming parallel light of a predetermined cross-section.
Figure 6C:
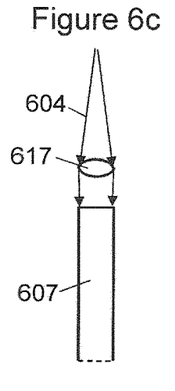
FIG. 6c illustrates schematically a light conduit having an image-forming element that accepts light from a predetermined point.
Figure 6D:
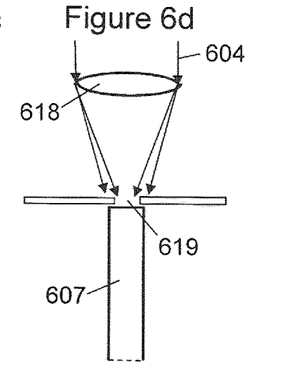
FIG. 6d illustrates schematically a light conduit having a field stop at its first end.

The field of view of each light conduit/light-conducting element may be defined by the inherent numerical aperture of the light-conducting element at its first end, by an image-forming optic element (such as a lens) positioned at its first end and/or by a field stop positioned at its first end. This aspect is illustrated in FIGS. 6*a*-6*d*. In FIG. 6*a*, the light-conducting element 607 receives light 604 from a field of view determined by the inherent numerical aperture of the light-conducting element 607. In FIG. 6*b*, the field of view of the light conduit 601 is limited by an optic element 616, whilst in FIG. 6*c*, the field of view is decreased by an optic element 617. In FIG. 6*d*, on the other hand, the field of view associated with the optic element 618 is reduced by an aperture 619 positioned in front of the first end 602, although a baffle could also be used. The head used to attach the light conduit 601 to the mechanical framework may be used as a baffle. Inserting optic elements 616-618 in front of the first ends 602 of the respective light conduits 601/light-conducting elements 607 and/or using field stops 619 can be used to provide greater sampling control.

Figure 7:
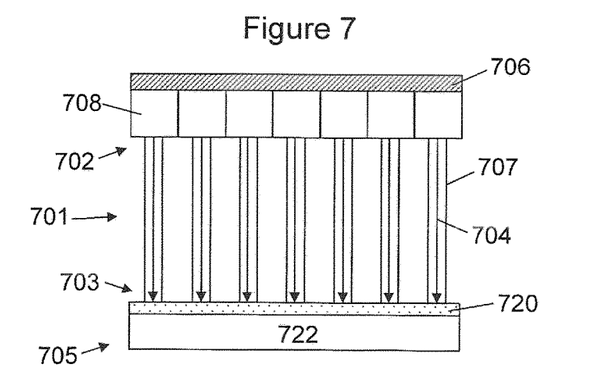
FIG. 7 illustrates schematically an embodiment of the present apparatus in which the second ends of the light conduits form an axially parallel array.

As mentioned previously, the first end 702 of each light conduit 701 may be connected to the mechanical frame 706 via the head 708 of the light conduit 701. As well as the position and orientation of the first ends 702 of the respective light conduits 701, the position and orientation of the second ends 703 is also an important consideration. The detector unit 705 is positioned at the second ends 703 of the light conduits 701. Some photodetectors 722, however, require the light 704 from each light conduit 701 to be incident upon its photosensitive surface 720 at an angle of 90° with respect to the plane of the surface 720. In addition, the light conduits 701 should ideally be positioned to make best use of the available detector area. In the example shown in FIG. 7, therefore, the second ends 703 of the respective light conduits 701 are configured to form a densely packed and axially parallel array in which the end surface of each light conducting element 707 is substantially parallel with the photosensitive surface 720. Furthermore, in this example, the end surfaces of the respective light conducting elements 707 are flush with the photosensitive surface 720 to facilitate detection of the light output. Nevertheless, a 30 disperser and/or additional optic elements could be positioned between the second end 703 of each light conduit 701 and the photodetector 722 as part of the detector unit 705, as described with reference to FIG. 1.

The various embodiments depicted in the figures have been provided with reference numerals that correspond to similar features of other described embodiments. For example, feature number 1 corresponds to numbers 101, 201, 301 etc. These numbered features may appear in some of the figures but may not have been directly referred to within the description of these particular embodiments. The features and their associated reference numerals have been provided in these figures to aid understanding of the embodiments.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A polarimetry apparatus comprising a plurality of flexible light conduits each having first and second ends, and a respective spectral or temporal polarization modulator associated with each light conduit, wherein each light conduit is configured to receive incident light from a different predetermined region in space via the first end, and deliver said light to a detector unit via the second end, and wherein the polarization modulator is configured to modulate a polarization of the light to enable a partial or complete polarization state of the incident light to be determined for each light conduit.

2. The apparatus of claim 1, wherein the apparatus further comprises a respective spatial polarization modulator associated with each light conduit.

3. The apparatus of claim 1, wherein each polarization modulator is positioned at the first end of the respective light conduit.

4. The apparatus of claim 1, wherein the apparatus comprises a field stop and/or one or more optic elements at the first end of each light conduit configured to define a field of view of the respective light conduit.

5. The apparatus of claim 1, wherein the second ends of the respective light conduits are configured to form an axially parallel array.

6. The apparatus of claim 1, wherein each light conduit comprises one or more light-conducting elements.

7. The apparatus of claim 1, wherein the apparatus comprises a respective polarizer associated with each light conduit configured to filter the light after modulation to produce a light output having an intensity which is representative of the polarization state.

8. The apparatus of claim 1, wherein the apparatus comprises a mechanical framework configured to define a position and axial orientation of each light conduit.

9. The apparatus of claim 6, wherein each light-conducting element comprises an optical fibre or a fluid-filled light pipe.

10. The apparatus of claim 7, wherein each polarizer is positioned at the first end of the respective light conduit.

11. The apparatus of claim 7, wherein the apparatus comprises a respective detector unit associated with each light conduit, the detector unit comprising a photodetector configured to record the light output from the respective polarizer.

12. The apparatus of claim 7, wherein the apparatus comprises one or more detector units, each detector unit associated with a plurality of light conduits and comprising a photodetector configured to record the light output from the respective polarizers.

13. The apparatus of claim 11, wherein each detector unit comprises a respective disperser configured to disperse the light output from the respective polarizers to generate intensity spectra for recording by the photodetector.

14. The apparatus of claim 8, wherein the mechanical framework is configured to define the position and axial orientation of each light conduit such that the different predetermined regions in space from which the incident light is received by the light conduits form contiguous segments of a total field of view of the apparatus at a predetermined distance from the mechanical framework.

15. The apparatus of claim 8, wherein the mechanical framework is configured to define the position and axial orientation of each light conduit such that the different predetermined regions in space from which the incident light is received by the light conduits form non-contiguous segments of a total field of view of the apparatus at a predetermined distance from the mechanical framework.

16. The apparatus of claim 8, wherein the mechanical framework is configured to define the position and axial orientation of each light conduit such that the first ends of the respective light conduits form a one, two or three dimensional array.

17. The apparatus of claim 8, wherein the mechanical framework is configured to define the position and axial orientation of each light conduit such that the first ends of the respective light conduits form an axially parallel, axially divergent or axially convergent array.

18. The apparatus of claim 8, wherein the mechanical framework has a planar, convex, concave, spherical, hemispherical or ellipsoidal shape.

19. The apparatus of claim 8, wherein each light conduit comprises a head for attaching the respective light conduit to the mechanical framework.

20. The apparatus of claim 19, wherein the head is configured to define a rotational orientation of the respective light conduit.

21. The apparatus of claim 19, wherein the head comprises one or more of a polarization modulator configured to modulate the polarization state of the light in a predefined manner, a polarizer configured to filter the light after modulation to produce a light output having an intensity which is representative of the polarization state, and one or more optic elements configured to direct the light into the respective light conduit.

22. A method comprising:
  receiving incident light from a plurality of different predetermined regions in space via first ends of a plurality of respective flexible light conduits;
  modulating a polarization of the light using a respective spectral or temporal polarization modulator associated with each light conduit; and
  delivering said light to one or more detector units via second ends of the respective light conduits to enable a partial or complete polarization state of the incident light to be determined for each light conduit.

23. A method comprising:
  providing a plurality of flexible light conduits having first and second ends, and a respective spectral or temporal polarization modulator associated with each light conduit;
  configuring each light conduit to receive incident light from a different predetermined region in space via the first end of the respective light conduit, and deliver said light to a detector unit via the second end of the respective light conduit; and
  configuring each polarization modulator to modulate a polarization of the light to enable a partial or complete polarization state of the incident light to be determined for each light conduit.

* * * * *

UNITED STATES PATENT AND TRADEMARK OFFICE
CERTIFICATE OF CORRECTION

PATENT NO. : 9,791,315 B2  
APPLICATION NO. : 14/761328  
DATED : October 17, 2017  
INVENTOR(S) : Keller et al.

Page 1 of 1

It is certified that error appears in the above-identified patent and that said Letters Patent is hereby corrected as shown below:

On the Title Page

On page 2, in Column 2, item (56) under "Other Publications", Line 11, delete "Kindom" and insert --Kingdom-- therefor Signed and Sealed this  
Twenty-first Day of April, 2020

Andrei Iancu  
*Director of the United States Patent and Trademark Office*